(12) United States Patent
Tang et al.

(10) Patent No.: US 11,466,189 B2
(45) Date of Patent: Oct. 11, 2022

(54) ABSORPTION CYCLE APPARATUS AND RELATED METHOD

(71) Applicant: General Electric Company, Schenectady, NY (US)

(72) Inventors: Ching-Jen Tang, Niskayuna, NY (US); Peter John Bonitatibus, Niskayuna, NY (US); Matthew Paul Rainka, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 280 days.

(21) Appl. No.: 16/499,247

(22) PCT Filed: Apr. 5, 2017

(86) PCT No.: PCT/US2017/026218
§ 371 (c)(1),
(2) Date: Sep. 28, 2019

(87) PCT Pub. No.: WO2018/186859
PCT Pub. Date: Oct. 11, 2018

(65) Prior Publication Data
US 2020/0172782 A1  Jun. 4, 2020

(51) Int. Cl.
*C09K 5/04* (2006.01)
*F25B 15/06* (2006.01)
(Continued)

(52) U.S. Cl.
CPC .............. *C09K 5/047* (2013.01); *C09K 5/04* (2013.01); *C09K 5/10* (2013.01); *F25B 15/02* (2013.01);
(Continued)

(58) Field of Classification Search
CPC .. C09K 5/047; C09K 5/10; C09K 5/04; F25B 15/02; F25B 15/06; F25B 2315/001
See application file for complete search history.

(56) References Cited

U.S. PATENT DOCUMENTS 5,255,534 A   10/1993  Ryan
5,577,388 A * 11/1996  Chandler ............... C09K 5/047
                                                  252/69
(Continued)

FOREIGN PATENT DOCUMENTS

CN   201740305 U   2/2011
JP   2009085509 A  4/2009
KR   20090077568 A 7/2009

OTHER PUBLICATIONS

Liaoa et al., "Absorption chiller crystallization control strategies for integrated cooling heating and power systems", International Journal of Refrigeration, vol. 30, Issue: 5, pp. 904-911, Aug. 2007.
(Continued)

Primary Examiner — Jane L Stanley
(74) Attorney, Agent, or Firm — Armstrong Teasdale LLP

(57) ABSTRACT

An absorption cycle apparatus including a working fluid is presented. The working fluid includes a metal halide, water and a zwitterion additive, wherein the zwitterion additive includes an amino acid, 2,2'-[(phosphonomethyl)imino]diaceticacid, 3-[(2-hydroxyethyl)amino]-1-propanesulfonic acid, or combinations thereof. A method of controlling crystallization in a working fluid of an absorption cycle apparatus is also presented.

19 Claims, 5 Drawing Sheets

Aspartic Acid

3-[(2-hydroxyethyl)amino]-1-propanesulfonic acid 2,2'-[(phosphonomethyl)imino]diaceticacid (51) Int. Cl.
*F25B 15/02* (2006.01)
*C09K 5/10* (2006.01)

(52) U.S. Cl.
CPC ........ *F25B 15/06* (2013.01); *F25B 2315/001* (2013.01); *Y02A 30/27* (2018.01); *Y02B 30/62* (2013.01); *Y02P 20/10* (2015.11)

(56) References Cited

U.S. PATENT DOCUMENTS

| | | | | |
|---|---|---|---|---|
| 5,876,623 | A * | 3/1999 | Tang | C08G 73/0233 252/180 |
| 6,155,057 | A | 12/2000 | Angell et al. | |
| 6,432,319 | B1 | 8/2002 | Ring et al. | |
| 2011/0247494 | A1* | 10/2011 | Dinnage | B01D 53/1493 95/92 |
| 2011/0309289 | A1* | 12/2011 | Quigley | F25B 15/06 252/69 |
| 2012/0011886 | A1 | 1/2012 | Shiflett et al. | |

OTHER PUBLICATIONS

Wang et al., "State-of-the-art review on crystallization control technologies for water/LiBr absorption heat pumps", International Journal of Refrigeration, vol. 34, Issue: 6, pp. 1325-1337, Sep. 2011.

Lefebvrea et al., "Lithium bromide crystallization in water applied to an inter-seasonal heat storage process", Chemical Engineering Science, vol. 133, pp. 2-8, Sep. 8, 2015.

Dirksen, J.A. et al., "Testing of crystallization inhibitors in industrial LiBr solutions," International journal of refrigeration 24, No. 8 (2001): 856-859.

Palecz, B.,"Thermochemical properties of I-α-amino acids in electrolyte-water mixtures," Fluid phase equilibria 167, No. 2 (2000): 253-261.

International Search Report and Written Opinion, dated Nov. 30, 2017, for International application No. PCT/US2017/026218 (9 pgs.).

* cited by examiner

ABSORPTION CYCLE APPARATUS AND RELATED METHOD

STATEMENT REGARDING FEDERALLY SPONSORED RESEARCH & DEVELOPMENT

This invention was made with Government support under contract number DE-AR0000578, awarded by the United States Department of Energy. The Government has certain rights in the invention.

BACKGROUND

Embodiments of the disclosure generally relate to an absorption cycle apparatus. More particularly, embodiments of the disclosure relate to an absorption cycle apparatus including a zwitterion additive for controlling crystallization of a working fluid.

Absorption cycle systems are thermally driven devices in which heat sources provide the driving thermal energy. Absorption cycle systems are environmentally friendly and generally use less electrical energy compared to conventional coolers/heaters that use electrically driven vapor compressors to provide the primary driving energy. A significant percentage of the world's commercial air conditioning and industrial refrigeration equipment is based on the use of absorption cycle systems (for example, absorption chillers). Most of these systems use water as the refrigerant and a lithium halide (e.g., lithium bromide) as the absorbent. However, in normal practice, lithium bromide hydrates are prone to crystallization in regions of the equipment where the local operating temperatures and lithium bromide concentrations are close to, or below, the crystallization curve. Precipitation of lithium bromide salts from lithium bromide/water solutions may thus limit the range of feasible operating conditions, limit the energy efficiency of the absorption cycle, and prevent use of air-cooled condensers and absorbers.

Therefore, there is a need for improved absorption cycle systems and methods for controlling crystallization of absorbents in the absorption cycle systems.

BRIEF DESCRIPTION

In one aspect, the disclosure relates to an absorption cycle apparatus including a working fluid. The working fluid includes a metal halide, water and a zwitterion additive, wherein the zwitterion additive includes an amino acid, 2,2'-[(phosphonomethyl)imino]diaceticacid, 3-[(2-hydroxyethyl)amino]-1-propanesulfonic acid, or combinations thereof.

In another aspect, the disclosure relates to an absorption cycle apparatus including a working fluid. The working fluid includes lithium bromide, water and aspartic acid.

In yet another aspect, the disclosure relates to a method of controlling crystallization in a working fluid of an absorption cycle apparatus. The method includes introducing a zwitterion additive to the working fluid. The working fluid includes a metal halide and water. The zwitterion additive includes an amino acid, 2,2'-[(phosphonomethyl)imino]diaceticacid, 3-[(2-hydroxyethyl)amino]-1-propanesulfonic acid, or combinations thereof.

These and other features, embodiments, and advantages of the present disclosure may be understood more readily by reference to the following detailed description.

DRAWINGS

These and other features, aspects, and advantages of the present disclosure will become better understood when the following detailed description is read with reference to the accompanying drawings, wherein.

DETAILED DESCRIPTION

In the following specification and the claims, which follow, reference will be made to a number of terms, which shall be defined to have the following meanings. The singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Here and throughout the specification and claims, range limitations may be combined and/or interchanged, such ranges are identified and include all the sub-ranges contained therein unless context or language indicates otherwise.

Embodiments of the present disclosure relate to an absorption cycle apparatus. An absorption cycle apparatus is any apparatus or system that produces heating or cooling by use of a working fluid and the absorption effect as described herein. In one embodiment, the absorption cycle system includes an absorption heat pump that may produce heat or cooling. In another embodiment, the absorption cycle apparatus includes an absorption chiller that produces cooling. In another embodiment, the absorption cycle apparatus includes an absorption heater. In yet another embodiment, the absorption cycle apparatus includes a thermal energy storage system.

Figure 1:
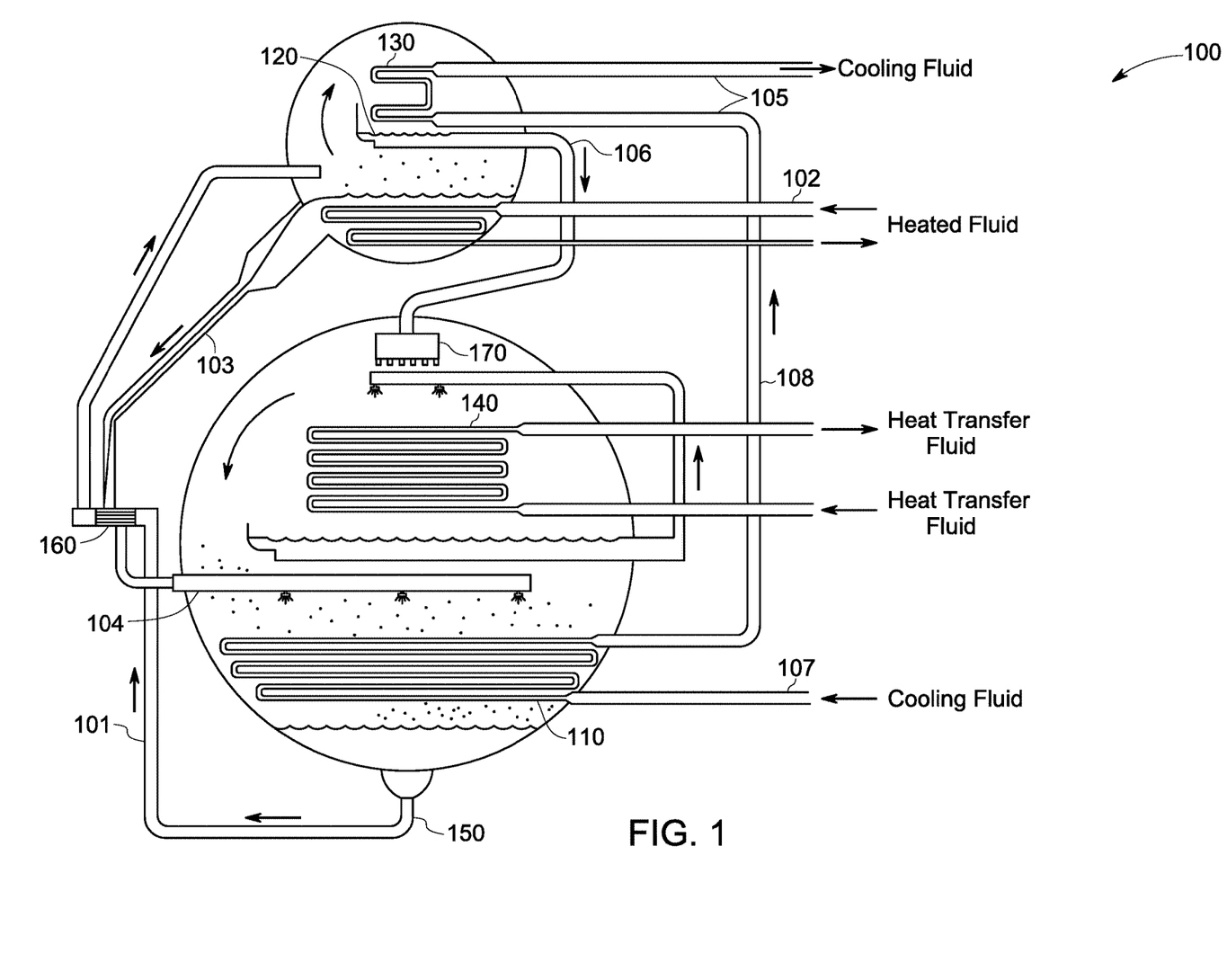
FIG. 1 illustrates an absorption cycle apparatus, in accordance with some embodiments of the disclosure.

In some embodiments, the absorption cycle apparatus includes an absorption cooling system (also known as absorption chiller). A schematic diagram of an example absorption cooling system 100 is shown in FIG. 1. The system 100 includes an absorber 110, a generator 120, a condenser 130, and an evaporator 140.

As mentioned previously, the absorption cycle apparatus produces heating or cooling by use of a working fluid. The term "working fluid" as used herein refers to a fluid pair in combination with one or more additives that can be used to provide the cooling or heating in an absorption cycle system.

In typical absorption cycle systems, the working fluid includes a pair of fluids that have an affinity for one another, e.g., solubility of one in the other at a particular concentration and temperature. The fluids in the pair of fluids may be referred to as an absorbent and a refrigerant. The absorbent is the non-volatile component and the refrigerant is the volatile component. The refrigerant is capable of functioning as a heat transfer fluid by undergoing a phase change from a liquid phase to a gaseous phase, and back. It is noted that although the term "refrigerant" may carry the connotation of a substance used only for cooling, the term is used herein in the generic sense of a thermal energy transfer fluid that is applicable for cooling and/or heating. As described in detail later, in typical absorption cycle apparatus, the absorbent may include a metal halide and the refrigerant may include water.

The absorber-generator fluid circuit, in some embodiments, may include an absorber, a generator, a heat exchanger, a pressure control device (or expansion device) and a pump for circulating the working fluid. Referring again to FIG. 1, in some embodiments, during operation of the absorption cycle apparatus 100, a refrigerant-rich working fluid is present in the absorber 110. In some embodiments, the amount of refrigerant present in a refrigerant-rich working fluid is in a range from about 38 weight percent to about 45 weight percent. The refrigerant-rich working fluid may be transferred to the generator 120 via a pump 150 and a conduit 101 as shown in FIG. 1. In some embodiments, the refrigerant-rich working fluid may be first pre-heated in a heat exchanger 160, as show in FIG. 1, before being transferred to the generator 120. Non-limiting example of a suitable heat exchanger 160 includes a shell and tube type heat exchanger. In some such embodiments, a refrigerant-lean working fluid from the generator 120 may function as a heat source in the heat exchanger 160, as described herein later.

After exiting the heat exchanger 160, the refrigerant-rich working fluid is transferred to the generator 120. In some embodiments, the generator may include a bundle of tubes that carry a heated fluid via conduit 102. The heated fluid transfers heat into the refrigerant-rich working fluid and thereby releases refrigerant vapor (e.g., water vapor) into a condenser 130 and forms a refrigerant-lean working fluid. As will be appreciated by one of ordinary skill in the art, the refrigerant-lean working fluid may still include some amount of refrigerant, however, the amount of refrigerant is lower than in the refrigerant-rich working fluid that leaves the absorber. In some embodiments, the amount of refrigerant present in a refrigerant-lean working fluid is in a range from about 34 weight percent to about 38 weight percent. The heated fluid supplied to the generator 120 in order to release refrigerant vapor from the working fluid may be supplied by any number of sources, including combustion gases, water heated with waste heat from a combustion engine (combustion gases), solar-heated water, and steam, among others.

The refrigerant-lean working fluid is transferred to the heat exchanger 160 via conduit 103, as shown in FIG. 1, where it is cooled by the refrigerant-rich working fluid being pumped out of the absorber 110. The refrigerant-lean working fluid is then transferred from the heat exchanger 160 to the absorber 110 via conduit 104 and collects in the bottom of the absorber, where it started the cycle.

As shown in FIG. 1, a cooling fluid may be provided to the condenser 130, via conduit 105, such that the refrigerant vapor condenses to form refrigerant liquid (e.g., water). The refrigerant liquid is transferred from the condenser 130 via conduit 106 to the evaporator 140. In some embodiments, the refrigerant liquid may be optionally transported through an expansion device 170 that partially evaporates the refrigerant liquid, before transferring the refrigerant liquid to the evaporator 140. While the refrigerant fluid is transported to the evaporator 140, a heat transfer fluid may be simultaneously circulated through the evaporator 140, as shown in FIG. 1. The heat transfer fluid is cooled as the liquid refrigerant is evaporated forming refrigerant vapor (e.g. water vapor). The cooled heat transfer fluid may be circulated back to a system being cooled, thus providing the cooling effect as desired. After the heat transfer is effected, the refrigerant vapor is transferred from the evaporator 140 to the absorber 110. The high affinity of the absorbent for the refrigerant causes the refrigerant to be dissolved into the working fluid thereby forming the refrigerant-rich working fluid, which can start the cycle again. Non-limiting examples of a suitable heat transfer fluid, in this context, may include water, air or a combination thereof.

The absorption of the refrigerant into the absorbent also generates heat (heat of absorption). As shown in FIG. 1, a cooling fluid may be circulated through the tube bundles of the absorber 110 to remove this heat of absorption from the system. A cooling fluid may be used in both the absorber and condenser as described above. As shown in FIG. 1, the cooling fluid is circulated through the absorber 110 via conduit 107 wherein it is heated slightly, due to the heat of solution of the refrigerant dissolving into the absorbent. From the absorber 110, the cooling fluid is circulated via the conduit 108 to the condenser tube bundle, wherein it provides the cooling effect to condense the refrigerant vapor to refrigerant liquid. The cooling fluid is thus heated somewhat again, and may be transported from the condenser via the conduit 105. Non-limiting examples of a suitable cooling fluid for the absorber 110 and the condenser 120 include water, air, or combinations thereof. The cooling fluids employed for the absorber 110 and the condenser 120 may be the same or different. As mentioned earlier, some embodiments of the present disclosure may allow for air-cooling of absorbers and condensers.

In the embodiment illustrated in FIG. 1, the absorption cycle apparatus may therefore function as a cooling system by absorbing heat from the heat transfer fluid in the evaporator 140, and circulating the cooled heat transfer fluid to the system being cooled. In another embodiment, in a similar manner to the system and process described above to produce cooling, an absorption cycle apparatus may be used to generate heat, for example, as an absorption heater. In this system and process, the heat of solution generated by dissolving the refrigerant into the absorbent in the absorber 110 and the heat of condensation generated by condensing the refrigerant vapor to refrigerant liquid in the condenser 130, can be transferred to a heat transfer fluid. The resulting heated heat transfer fluid can be then circulated to the system being heated.

Figure 4:
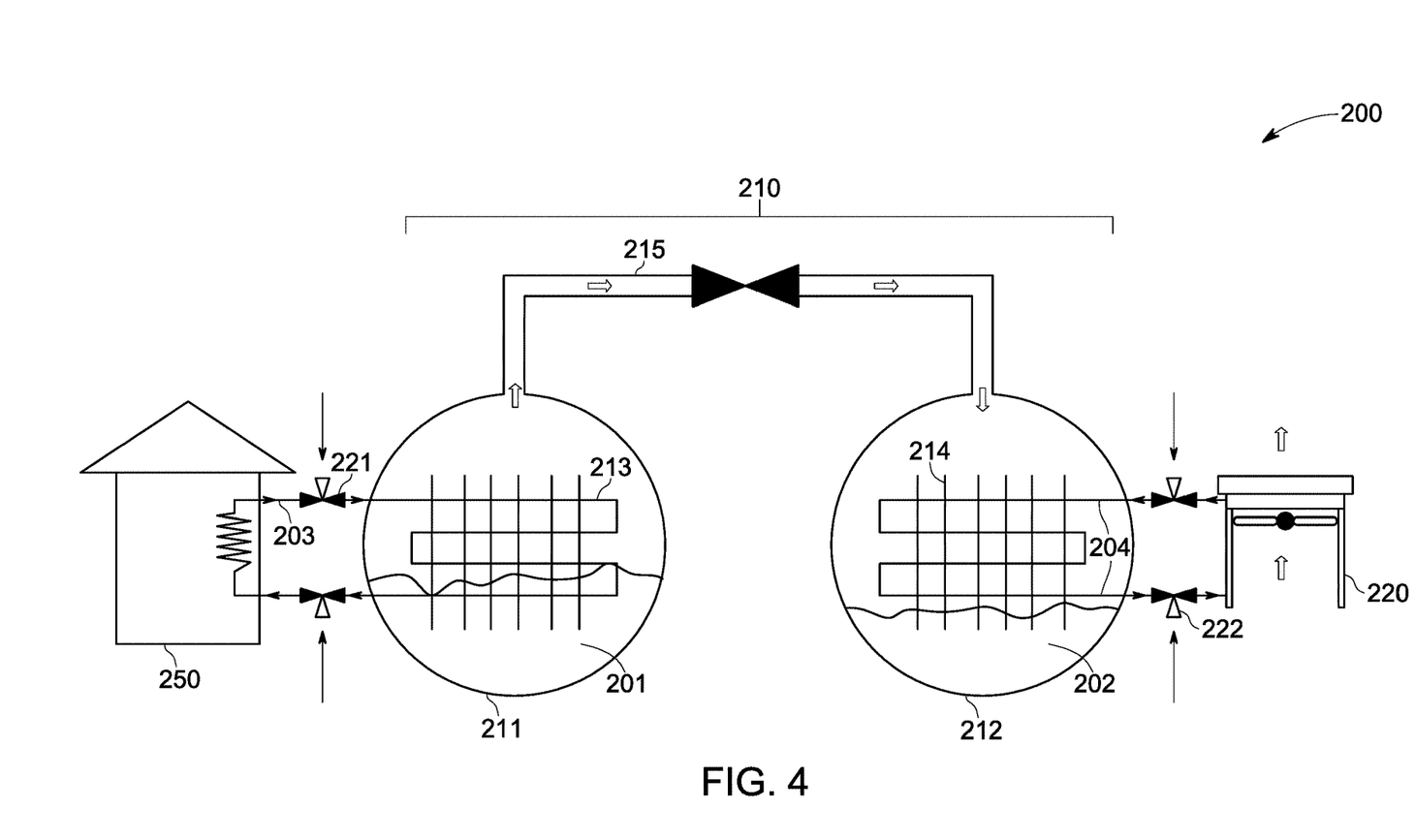
FIG. 4 illustrates a discharging configuration of a thermal energy storage system, in accordance with some embodiments of the disclosure.
Figure 5:
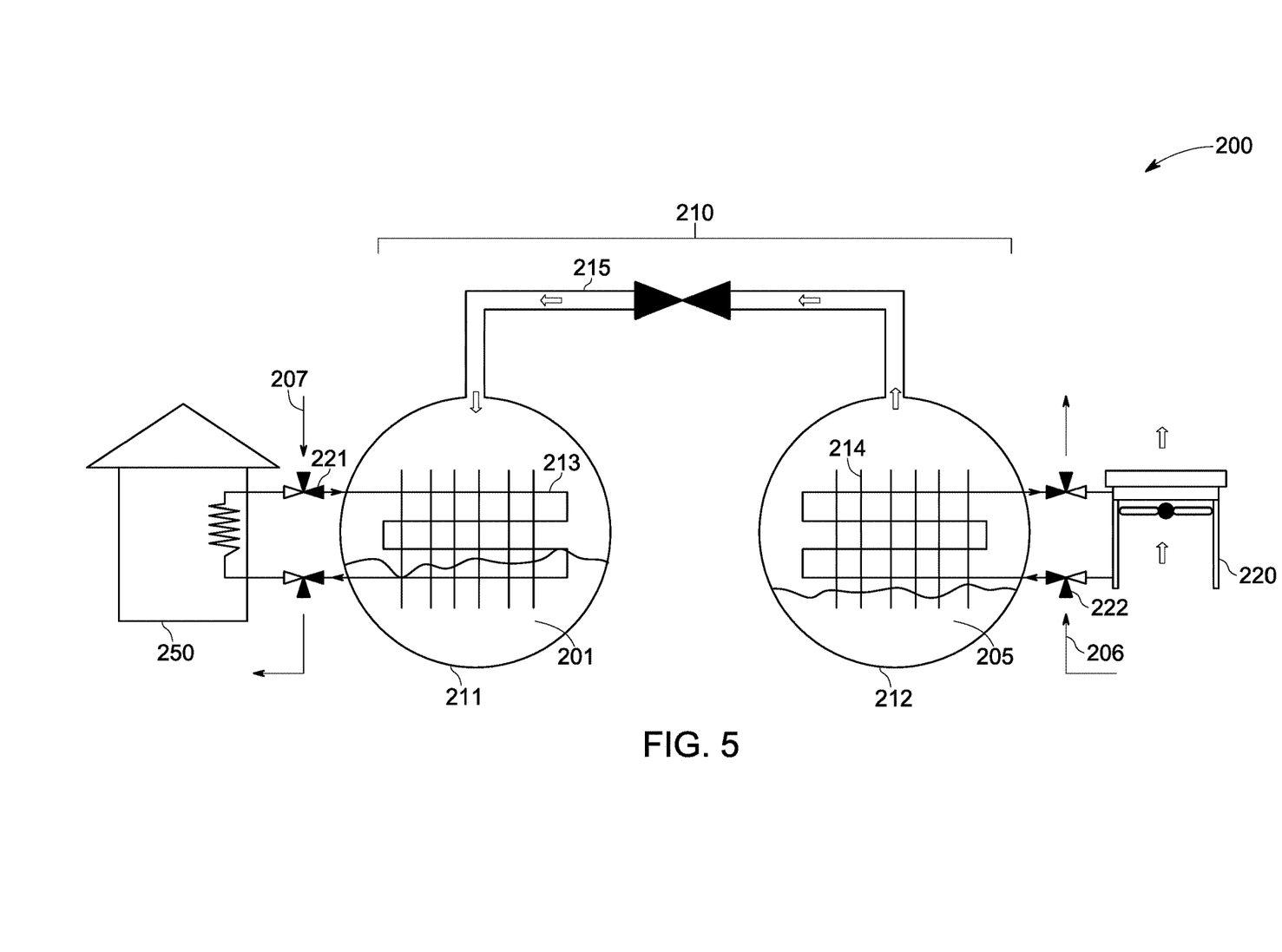
FIG. 5 illustrates a charging configuration of a thermal energy storage system, in accordance with some embodiments of the disclosure.

In another embodiment, an absorption cycle apparatus as described above may be used as a thermal energy storage apparatus. A schematic diagram of an example thermal energy storage system 200 employing the absorption cycle apparatus in accordance with embodiments of the invention, is shown in FIGS. 4 and 5. In the embodiment illustrated in FIGS. 4 and 5, the thermal energy storage system 200 includes the absorption cycle apparatus 210. The absorption cycle apparatus 210 includes a refrigerant chamber 211, an absorbent chamber 212, a first heat exchanger 213, a second heat exchanger 214, and a conduit 215 that fluidly connects the refrigerant chamber 211 with the absorbent chamber 212.

The principle of operation of the thermal energy storage apparatus during discharging is illustrated in FIG. 4, as an example. During discharging, liquid refrigerant 201 (e.g., water) present in the refrigerant chamber 211 absorbs heat from the first heat exchanger 213 and evaporates forming refrigerant vapor (e.g., water vapor). The resulting refrigerant vapor is transported from the refrigerant chamber 211 via the conduit 215 to the absorbent chamber 212. The refrigerant vapor is absorbed by the refrigerant-lean working fluid 202 present in the absorbent chamber 212, thereby releasing heat to the second heat exchanger 214.

Any suitable heat transfer fluid 203 may be circulated (e.g., via a three-way valve 221) through the first heat exchanger 213 to discharge heat to the first heat exchanger 213. The cooled heat transfer fluid may be then circulated back to a system 250 being cooled, thus providing the cooling effect as desired. In the embodiment, illustrated in FIG. 4, e.g., the cooled heat transfer fluid may be circulated to a building 250 to provide cooling and reduce the indoor temperature.

Similarly, any suitable heat transfer fluid 204 may be circulated (e.g., via a three-way valve 222) through the second heat exchanger 214 to absorb heat from the second heat exchanger 214. The heated heat transfer fluid may be then transferred to a suitable heat rejection device 220 (e.g., a fin fan cooler as illustrated in FIG. 4), where the heated transfer fluid may discharge heat. The resulting cooled heat transfer fluid may be then recirculated to the second heat exchanger 214. Non-limiting examples of a suitable heat transfer fluid 206/207, in this context, may include water, air or a combination thereof.

During the charging of the thermal energy storage apparatus as illustrated in FIG. 5, the refrigerant-rich working fluid 205 absorbs heat from the second heat exchanger 214, and desorbs at least a portion of the refrigerant. The resulting refrigerant vapor is transported from the absorbent chamber 212 to the refrigerant chamber 211 via the conduit 215, where it discharges heat to the first heat exchanger 213. Thus, the vapor refrigerant is condensed into liquid refrigerant 201 in the refrigerant chamber 211.

Any suitable heat transfer fluid 206 (e.g., from a waste heat source) may be circulated (e.g., via a three-way valve 222) through the second heat exchanger 214 to discharge heat to the refrigerant-rich working fluid 205. The cooled heat transfer fluid may be then transported back to the waste heat source to absorb heat, and circulated again to the second heat exchanger 214. Similarly, a heat transfer fluid 207 may be circulated (e.g., via a three-way valve 221) through the first heat exchanger 213 to absorb heat from the first heat exchanger 213. The heated heat transfer fluid may be then transferred to a suitable heat rejection device (not shown in the FIG. 5), where the heated heat transfer fluid may discharge heat. The resulting cooled heat transfer fluid may be then recirculated to the first heat exchanger 213. Non-limiting examples of a suitable heat transfer fluid 206/207, in this context, may include water, air or a combination thereof.

As mentioned previously, a conventional absorption cycle apparatus, regardless of the application (that is, as a chiller, a heater, or energy storage system) employs a lithium halide salt as an absorbent and water as a refrigerant. However, the possibility of lithium halide salt crystallization in the absorber/absorbent chamber and resulting operational challenges, limits the range of feasible operating conditions and the energy efficiency of the absorption cycle apparatus. Further, in typical absorption cooling systems, water is used as a cooling fluid in the absorber and the condenser. However, use of water-based cooling fluids may have additional associated costs and space requirements (e.g., need for cooling towers). Furthermore, water-based cooling systems may involve consumption of large quantities of water, which is a limited resource in my regions. However, use of air-cooling for absorbers and condensers is again limited because of the challenges posed by lithium halide salt crystallization.

Embodiments of the present disclosure address the noted shortcomings in the art. In accordance with embodiments of the present disclosure, an absorption cycle apparatus includes a working fluid including a metal halide, water and a zwitterion additive. The metal halide in the working fluid functions as the absorbent and the water functions as a refrigerant. Without being bound by any theory, it is believed that the addition of the zwitterion additive in the working fluid may shift the metal halide concentration-temperature crystallization curve to higher metal halide concentrations and lower temperatures. Therefore, the addition of the zwitterion additive may allow more reliable operation of the apparatus over a wider ranges of metal halide concentrations and temperatures without crystallization of the metal halide. Additionally, application of absorption cooling to lower absorbent temperature applications may be possible if the apparatus is able to operate at a lower absorbent temperature without crystallization of the metal halide.

Referring again to FIG. 1, the working fluid including the metal halide, water and the zwitterion additive is present in the absorber 110 at the beginning of the cycle. As described previously, at this instance, the working fluid at the exit of the absorber 110 may also be referred to as refrigerant-rich working fluid. Therefore, in accordance with embodiments of the disclosure, a refrigerant-rich working fluid as discussed previously includes the metal halide, the zwitterion additive and water. This working fluid may be then pumped to the generator 120 where the water evaporates to form water vapor, and a resulting refrigerant-lean working fluid is transferred back to the absorber 110. The refrigerant-lean working fluid, in accordance with embodiments of the disclosure, includes the metal halide, the zwitterion additive and optionally some amount of water. Therefore, the term "working fluid" as used in this context refers to both the refrigerant-rich working fluid and the refrigerant-lean working fluid.

Similarly, in the embodiments illustrated in FIGS. 4 and 5, the absorbent chamber 212 includes the working fluid in accordance with embodiments described herein. Therefore, at any given time during operation of the thermal energy storage system, the absorbent chamber 212 includes a working fluid including a metal halide, water and the zwitterion additive. As described in detail earlier, the amount of water (refrigerant) in the working fluid in the absorbent chamber may vary depending on whether the system is in the charged or discharged state. Therefore, the term "working fluid" as used in this context also refers to both the refrigerant-rich working fluid and the refrigerant-lean working fluid.

The term zwitterion additive as used herein refers to a neutral molecule with a positive and a negative electrical charge but with a net charge of zero. The zwitterion additive includes an amino acid, 2,2'-[(phosphonomethyl)imino]diaceticacid, 3-[(2-hydroxyethyl)amino]-1-propanesulfonic acid, or combinations thereof. In some embodiments, the zwitterion additive includes an amino acid. In certain embodiments, the zwitterion additive includes aspartic acid.

Figure 2:
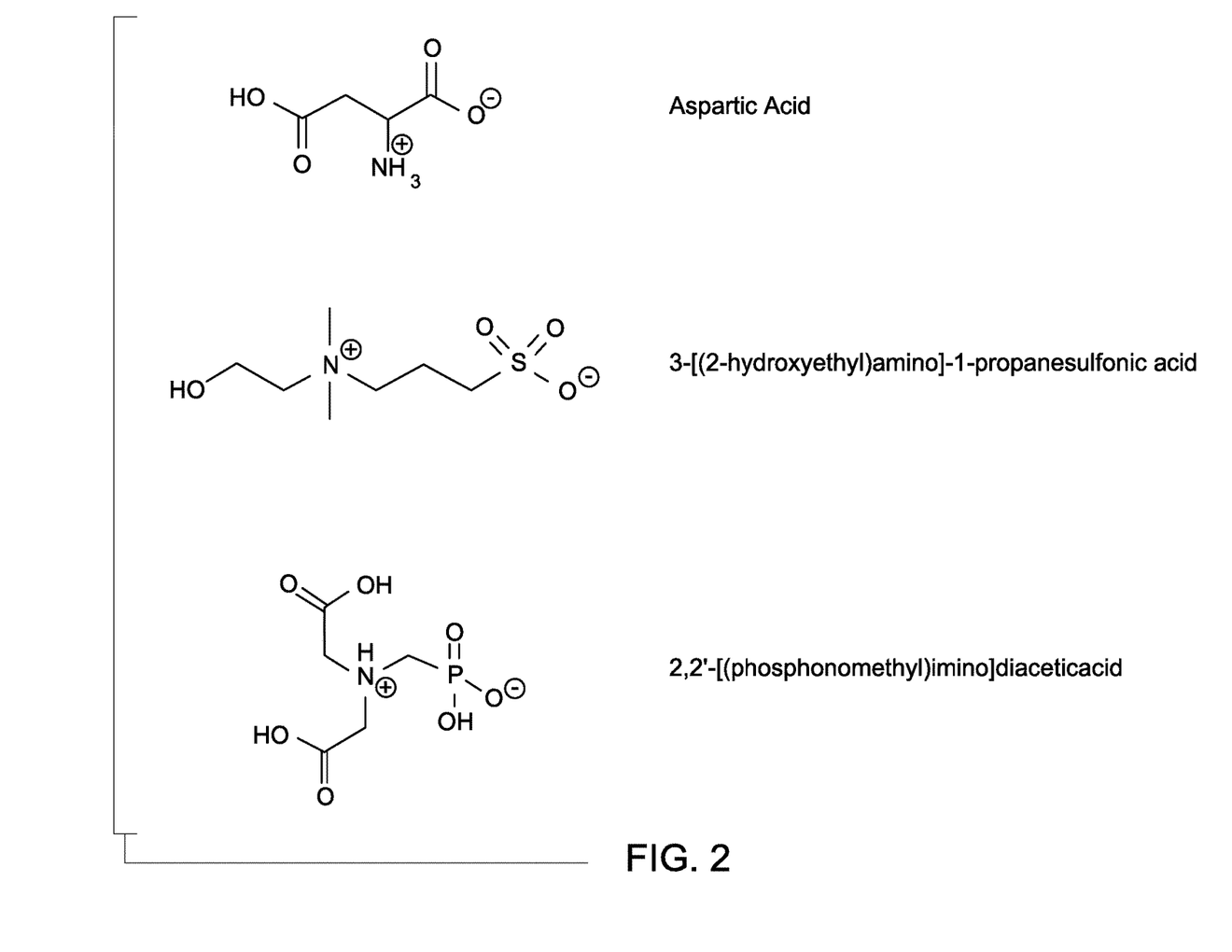
FIG. 2 illustrates examples of zwitterion ion additives, in accordance with some embodiments of the disclosure.

FIG. 2, shows the molecular formulae for exemplary zwitterion additives, in accordance with some embodiments of the disclosure.

Non-limiting examples of a suitable metal halide as absorbent includes a lithium halide, a calcium halide, or a combination thereof. In some embodiments, the metal halide includes lithium chloride, lithium bromide, calcium chloride, or combinations thereof. In certain embodiments, the metal halide includes lithium bromide. In some embodiments, lithium bromide may contain other lithium halides, including lithium fluoride, lithium chloride, lithium iodide and mixtures thereof. The amounts of the other lithium halides present in lithium bromide is expected to be low with the most prevalent being the chloride. In some embodiments, at least a portion of lithium bromide is present in the form of a hydrate in the working fluid.

The amount of the metal halide, water, and the zwitterion additive in the working fluid may be varied to maximize the absorption of water by the metal halide at a given operating temperature while minimizing crystallization of the metal halide. In practice, the maximum allowable metal halide concentration will be the concentration where metal halide starts precipitating at the lowest temperature experienced by the working fluid during operation.

Further, as will be appreciated by one of ordinary skill in the art, the amount of the metal halide and water in the working fluid may vary depending on the location of the working fluid (e.g., in the absorber or the generator) and the absorption cycle stage (e.g., absorption or generation stage). For this disclosure, working fluid concentrations will be discussed in the context of the working fluid present in the absorber stage. In some embodiments, the amount of metal halide in the working fluid is in a range from about 30 weight percent to about 85 weight percent of the working fluid. In some embodiments, the amount of metal halide in the working fluid is in a range from about 40 weight percent to about 75 weight percent of the working fluid. In some embodiments, the amount of metal halide in the working fluid is in a range from about 55 weight percent to about 70 weight percent of the working fluid. In certain embodiment, the metal halide includes lithium bromide, and the amount of lithium bromide in the working fluid is in a range from about 60 weight percent to about 65 weight percent of the working fluid. Further, the amount of metal halide in the working fluid may also depend on the end-use application of the absorption cycle apparatus, for example, as a chiller or a heater. For some applications (e.g., heating), the amount of metal halide in the working fluid may be in a range from about 30 weight percent to about 60 weight percent of the working fluid.

The amount of the zwitterion additive in the working fluid may be controlled such that the desired reduction in the crystallization temperature is achieved while the performance characteristics of the working fluid are not significantly affected. In some embodiments, the zwitterion additive may be added to the working fluid in an amount such that it does not significantly effect one or more of 1) the heat capacity of the solution, 2) the solution rheological properties, 3) the solution diffusion or mass transfer coefficients, or 4) the ability of the solution to absorb water vapor and transfer heat.

In some embodiments, the zwitterion additive is present in the working fluid in an amount in a range from about 100 parts per million to about 100000 parts per million of the working fluid. In some embodiments, the zwitterion additive is present in the working fluid in an amount in a range from about 2000 parts per million to about 25000 parts per million of the working fluid. In some embodiments, the zwitterion additive is present in the working fluid in an amount in a range from about 2500 parts per million to about 7500 parts per million of the working fluid. The term "parts per million" or "ppm" as used herein refers to the concentration of the zwitterion additive in the working fluid calculated as a ratio of mass to mass. Therefore, 1 ppm is equivalent to one milligram of the zwitterion additive per kilogram of the working fluid.

In some embodiments, the zwitterion additive is present in the working fluid in an amount in a range from about 0.1 weight percent to about 10 weight percent of the metal halide. In some embodiments, the zwitterion additive is present in the working fluid in an amount in a range from about 0.5 weight percent to about 10 weight percent of the metal halide. In some embodiments, the zwitterion additive is present in the working fluid in an amount in a range from about 1 weight percent to about 5 weight percent of the metal halide.

In certain embodiments, the working fluid includes lithium bromide, water and aspartic acid. In some such embodiments, the aspartic acid is present in the working fluid in an amount in a range from about 1000 parts per million to about 50000 parts per million of the working fluid. In some embodiments, the aspartic acid is present in the working fluid in an amount in a range from about 2500 parts per million to about 7500 parts per million of the working fluid.

The metal halide concentration is desirably, at minimum, sufficient to effectively absorb the refrigerant (water) at the lowest operating temperature. The minimum metal halide concentration useful for this purpose increases as the solution temperature is lowered, until a low temperature is reached where the minimum and maximum concentrations converge at a saturation level. For a solution employing only lithium bromide as the absorbent and only water as the refrigerant, a practical lithium bromide concentration of about 60-62% yields precipitation at a minimum operating temperature of about 25-30° C.

Embodiments of the present disclosure are directed towards one or both of maximizing the metal halide (e.g., lithium bromide) concentration in the working fluid and lowering the minimum operating temperature of working fluids (e.g., containing lithium bromide and water). Inventors of the present disclosure have found that by selectively controlling the compositional characteristics and amounts of the zwitterion additives, one or both of maximizing the metal halide (e.g., lithium bromide) concentration in the working fluid and lowering the minimum operating temperature of working fluids (e.g., containing lithium bromide and water) may be achieved.

In some embodiments, the metal halide in the working fluid (with zwitterion additive) includes lithium halide at a concentration of about 64 weight percent of the working fluid, and a crystallization temperature of lithium halide in the working fluid is less than 10° C. In some embodiments, the metal halide in the working fluid includes lithium halide at a concentration of about 64 weight percent of the working fluid, and a crystallization temperature of lithium halide in the working fluid is less than 8° C. In some embodiments, the metal halide in the working fluid includes lithium halide at a concentration of about 64 weight percent of the working fluid, and a crystallization temperature of lithium halide in the working fluid is less than 5° C. Therefore, addition of zwitterion additives, in accordance with embodiments of the disclosure may allow for higher amounts (about 64 weight percent) of lithium bromide as absorbent while keeping the crystallization temperatures lower than 10° C.

In some embodiments, the metal halide in the working fluid (with zwitterion additive) includes lithium halide at a concentration of about 62 weight percent of the working fluid, and a crystallization temperature of lithium halide in the working fluid is less than 0° C. In some embodiments, the metal halide in the working fluid includes lithium halide at a concentration of about 62 weight percent of the working fluid, and a crystallization temperature of lithium halide in the working fluid is less than −5° C. In some embodiments, the metal halide in the working fluid includes lithium halide at a concentration of about 62 weight percent of the working fluid, and a crystallization temperature of lithium halide in the working fluid is less than −10° C. Therefore, addition of zwitterion additives, in accordance with embodiments of the disclosure may lower the crystallization temperature to temperatures lower than 0° C. while maintaining the lithium bromide concentration at 62 weight percent.

In some embodiments, the working fluid may include one or more additional additives. Non-limiting examples of additional additives include, corrosion inhibitors (for example, molybdates), alkaline treating agents (for example, lithium hydroxide), antifoaming agents including alcohols and glycols, and any other additive known in the art that are useful for absorption cycle systems.

A method of controlling crystallization in a working fluid of an absorption cycle apparatus is also presented. The method includes introducing a zwitterion additive to the working fluid. As discussed previously, the working fluid includes a metal halide and water, and the zwitterion additive includes an amino acid, 2,2'-[(phosphonomethyl)imino]diaceticacid, 3-[(2-hydroxyethyl)amino]-1-propanesulfonic acid, or combinations thereof.

In some embodiments, the metal halide includes a lithium halide, a calcium halide, or a combination thereof. In some embodiments, the metal halide includes lithium chloride, lithium bromide, calcium chloride, or combinations thereof. In some embodiments, the zwitterion additive includes an amino acid. In certain embodiments, the zwitterion additive includes aspartic acid. In certain embodiments, the working fluid includes lithium bromide and water, and the method includes introducing aspartic acid to the working fluid.

The zwitterion additive may be introduced to the working fluid using any suitable technique, for example, mixing the components in the desired amounts. In some embodiments, the zwitterion additive is introduced in the working fluid in an amount in a range from about 1000 parts per million to about 100000 parts per million of the working fluid. In some embodiments, the zwitterion additive is introduced in the working fluid in an amount in a range from about 2000 parts per million to about 25000 parts per million of the working fluid. In some embodiments, the zwitterion additive is introduced in the working fluid in an amount in a range from about 2500 parts per million to about 7500 parts per million of the working fluid. In some embodiments, the zwitterion additive is introduced in the working fluid in an amount in a range from about 0.1 weight percent to about 10 weight percent of the metal halide. In some embodiments, the zwitterion additive is introduced in the working fluid in an amount in a range from about 0.5 weight percent to about 7.5 weight percent of the metal halide. In some embodiments, the zwitterion additive is introduced in the working fluid in an amount in a range from about 1 weight percent to about 5 weight percent of the metal halide.

In some embodiments, the metal halide is lithium bromide present at a concentration of about 64 weight percent of the working fluid, and a crystallization temperature of lithium halide in the working fluid is lowered by at least 5° C. after introduction of the zwitterion additive to the working fluid. In some embodiments, a crystallization temperature of lithium halide in the working fluid is lowered by at least 10° C. after introduction of the zwitterion additive to the working fluid. In some embodiments, a crystallization temperature of lithium halide in the working fluid is lowered by at least 30° C. after introduction of the zwitterion additive to the working fluid.

The absorption cycle apparatus and related method as disclosed herein may have a wide range of absorption cycle applications, including, but not limited to refrigeration, air conditioning, heating, thermal energy storage, and power generation. In some embodiments, the absorption cycle apparatus may be an absorption chiller, and may find application as an air conditioner. In some embodiments, the absorption cycle apparatus may be an absorption heater and may find application as a heating equipment. In some embodiments, the absorption cycle apparatus may be a thermal energy storage system, and may be employed for storing and providing thermal energy.

In some embodiments, an absorption cycle apparatus describe herein may be deployed for use in, or fabricated or operated as, a refrigerator, a freezer, an ice machine, an air conditioner, an industrial cooling system, a heater, a storage system, or a heat pump. Each of these systems may be situated in a residential, commercial or industrial setting, or may be incorporated into a mobilized system for transportation.

Without being bound by any theory, it is believed that the addition of zwitterion additives to the working fluid in accordance with embodiments of the disclosure improves operability of the absorption cycle systems. In particular, for absorption chillers, addition of the zwitterion additives may have multiple benefits. First, the increased solubility of lithium bromide in the working fluid may allow for lower system vapor pressures, which reduces compressor demand and broadens the range for operating conditions. Second, the increase in solubility may also provide system safety during unintended shutdown as the higher concentration lithium bromide solutions can remain homogeneous and not crystallize in the absence of heat. This may obviate or minimize the requirement for additional safety hardware and controls. Furthermore, the increase in solubility at lower temperatures could provide for improved thermal energy storage systems. The energy density of these storage systems is related to the crystal morphology and crystallization temperature of the lithium bromide. By lowering the crystallization temperature these systems could be employed in substantially colder environments and their energy density can be increased.

EXAMPLES

Example 1 Effect of Zwitterion Additives on Crystallization Temperature

Three different zwitterion additives were added to a working fluid including lithium bromide and water (mass fraction of lithium bromide was about 60%). The amount of zwitterion additive (dose measured as ppm) in the working fluid was varied. Shift in crystallization temperatures relative to a working fluid that did not include the zwitterion additives was measured. Table 1 shows the shift in crystallization temperatures for different zwitterion additives at different doses.

TABLE 1

Shift in crystallization temperatures for different zwitterion additives at different doses.

| Zwitterion Additive | Dose (ppm) | Shift in Crystallization Temperature (° C.) |
|---|---|---|
| 2,2'-[(phosphonomethyl)imino]diaceticacid | 250 | −6.7 |
| 2,2'-[(phosphonomethyl)imino]diaceticacid | 2500 | −9.3 |
| 3-[(2-hydroxyethyl)amino]-1-propanesulfonic acid | 2500 | −4.5 |
| 3-[(2-hydroxyethyl)amino]-1-propanesulfonic acid | 10000 | −9.45 |
| Aspartic Acid | 5000 | −8.8 |

Example 2 Effect of Aspartic Acid as Zwitterion Additive

Aspartic acid was added to a working fluid including lithium bromide and water. The weight fraction of lithium bromide was varied in the working fluid and the crystallization temperature of lithium bromide in the solution was determined, thereby obtaining a crystallization curve. The amount of aspartic acid in the working fluid was maintained at about 9 weight percent relative to the amount of lithium halide in the working fluid.

Figure 3:
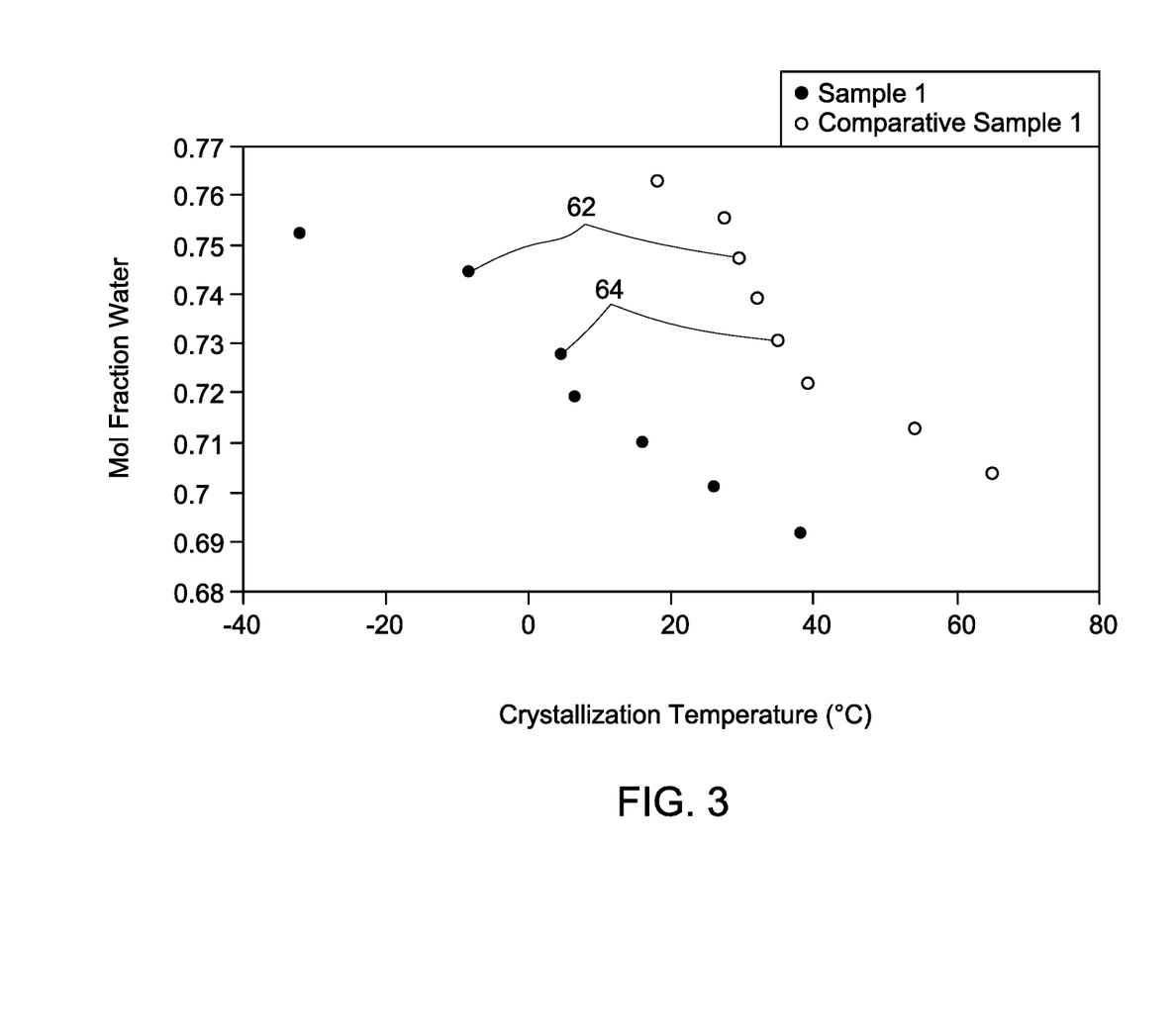
FIG. 3 illustrates crystallization curves for different working fluids, in accordance with some embodiments of the disclosure.

FIG. 3 shows the crystallization curve for a working fluid including aspartic acid (Sample 1) and a working fluid free of aspartic acid (Comparative Sample 1). As shown in FIG. 3, at a lithium bromide concentration of about 64 weight percent (~0.73 mole fraction water, denoted by reference numeral "64"), the crystallization temperature for Comparative Sample 1 was about 35° C. At the same lithium bromide concentration, Sample 1 (including zwitterion additive aspartic acid) had a crystallization temperature of about 7° C. Similarly, at a lithium bromide concentration of about 62 weight percent (~0.747 mole fraction water, denoted by reference numeral "62"), the crystallization temperature for Comparative Sample 1 was about 30° C. At the same lithium bromide concentration, Sample 1 (including zwitterion additive aspartic acid) had a crystallization temperature of about −8° C. Therefore, addition of aspartic acid resulted in a significant reduction in crystallization temperature.

The improvement in solubility was most pronounced at concentrations of lithium bromide that typically produced di-hydrate crystals in literature studies. It was also observed that the presence of the zwitterion additives increased the solution vapor pressure relative to a traditional lithium bromide solution. However, the substantial increase in solubility, especially at lower temperatures allows for overall achievable system vapor pressures to be lower in the presence of the additive.

The foregoing examples are merely illustrative, serving to exemplify only some of the features of the invention. The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of" Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. An absorption cycle apparatus, comprising:
   an absorption cooling system; and
   a working fluid comprising a metal halide, water, and a zwitterion additive, wherein the zwitterion additive comprises aspartic acid, 2,2'-[(phosphonomethyl)imino] diacetic acid, 3-[(2-hydroxyethyl)amino]-1-propanesulfonic acid, or combinations thereof.

2. The absorption cycle apparatus of claim 1, wherein the metal halide comprises a lithium halide, a calcium halide, or a combination thereof.

3. The absorption cycle apparatus of claim 1, wherein the metal halide comprises lithium chloride, lithium bromide, calcium chloride, or combinations thereof.

4. The absorption cycle apparatus of claim 1, wherein the zwitterion additive is present in the working fluid in an amount in a range from about 100 parts per million to about 100000 parts per million.

5. The absorption cycle apparatus of claim 1, wherein the zwitterion additive is present in the working fluid in an amount in a range from about 0.1 weight percent to about 10 weight percent of the metal halide.

6. The absorption cycle apparatus of claim 1, wherein the metal halide is lithium bromide, and a crystallization temperature of lithium bromide in the working fluid is less than 10° C. at a concentration of about 64 weight percent of the working fluid.

7. The absorption cycle apparatus of claim 1, wherein the absorption cycle apparatus is an absorption chiller, an absorption heater, or a thermal energy storage apparatus.

8. The absorption cycle apparatus of claim 1, wherein the working fluid consists of the metal halide, water, the zwitterion additive, optionally a corrosion inhibitor, optionally an alkaline treating agent, and optionally an antifoaming agent.

9. An absorption cycle apparatus, comprising:
   an absorption cooling system; and
   a working fluid comprising lithium bromide, water, and aspartic acid.

10. The absorption cycle apparatus of claim 9, wherein aspartic acid is present in the working fluid in an amount in a range from about 1000 parts per million to about 50000 parts per million.

11. The absorption cycle apparatus of claim 9, wherein the working fluid consists of lithium bromide, water, aspartic acid, optionally a corrosion inhibitor, optionally an alkaline treating agent, and optionally an antifoaming agent.

12. A method of controlling crystallization in a working fluid of an absorption cycle apparatus comprising an absorption cooling system, comprising:
   introducing a zwitterion additive to the working fluid, wherein the working fluid comprises a metal halide and water, and the zwitterion additive comprises aspartic acid, 2,2'-[(phosphonomethyl)imino] diacetic acid, 3-[(2-hydroxyethyl)amino]-1-propanesulfonic acid, or combinations thereof.

13. The method of claim 12, wherein the metal halide comprises a lithium halide, a calcium halide, or a combination thereof.

14. The method of claim 12, wherein the metal halide comprises lithium chloride, lithium bromide, calcium chloride, or combinations thereof.

15. The method of claim 12, wherein the zwitterion additive is introduced in the working fluid in an amount in a range from about 100 parts per million to about 100000 parts per million.

16. The method of claim 12, wherein the zwitterion additive is introduced in the working fluid in an amount in a range from about 0.1 weight percent to about 10 weight percent of the metal halide.

17. The method of claim 12, wherein the metal halide is lithium bromide present at a concentration of about 64 weight percent of the working fluid, and a crystallization temperature of lithium bromide in the working fluid is lowered by at least 5° C. after introduction of the zwitterion additive to the working fluid.

18. The method of claim 12, wherein the absorption cycle apparatus is an absorption chiller, an absorption heater, or a thermal energy storage apparatus.

19. The method of claim 12, wherein, after the introduction of the zwitterion additive to the working fluid, the working fluid consists of the metal halide, water, the zwitterion additive, optionally a corrosion inhibitor, optionally an alkaline treating agent, and optionally an antifoaming agent.

\* \* \* \* \*